United States Patent
Hebert

(10) Patent No.: US 8,922,970 B2
(45) Date of Patent: Dec. 30, 2014

(54) LIGHTNING PROTECTION SHEET WITH PATTERNED CONDUCTOR

(75) Inventor: Larry S. Hebert, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 837 days.

(21) Appl. No.: 12/761,162

(22) Filed: Apr. 15, 2010

(65) Prior Publication Data

US 2010/0263898 A1    Oct. 21, 2010

Related U.S. Application Data

(60) Provisional application No. 61/170,352, filed on Apr. 17, 2009.

(51) Int. Cl.
*H05F 3/00* (2006.01)
*B64D 45/02* (2006.01)
*B64C 1/12* (2006.01)
*H02G 13/00* (2006.01)

(52) U.S. Cl.
CPC .............. *H02G 13/00* (2013.01); *B64D 45/02* (2013.01); *B64C 1/12* (2013.01); *H02G 13/80* (2013.01)
USPC ............ 361/217; 361/218; 361/216; 361/220

(58) Field of Classification Search
CPC .......... B64D 45/02; B60R 16/06; H05F 3/00; H05F 3/02
USPC ................... 361/217, 218, 216, 220
See application file for complete search history.

(56) References Cited

U.S. PATENT DOCUMENTS

| | | | | |
|---|---|---|---|---|
| 2,734,007 | A | * | 2/1956 | Toulmin ..................... 428/161 |
| 3,755,713 | A | | 8/1973 | Paszkowski |
| 3,989,984 | A | | 11/1976 | Amason et al. |
| 4,308,568 | A | * | 12/1981 | Whewell ..................... 361/216 |
| 4,329,731 | A | | 5/1982 | Meulenberg, Jr. |
| 4,352,142 | A | * | 9/1982 | Olson ........................ 361/218 |
| 4,429,341 | A | | 1/1984 | King |
| 4,494,165 | A | * | 1/1985 | Maheshwari ............... 361/117 |
| 4,781,443 | A | * | 11/1988 | Giles .......................... 252/500 |
| 4,912,594 | A | * | 3/1990 | Bannink et al. ............ 361/218 |
| 4,920,163 | A | * | 4/1990 | Guillaumon et al. ........ 523/440 |

(Continued)

FOREIGN PATENT DOCUMENTS

| | | |
|---|---|---|
| CN | 1500628 | 6/2004 |
| DE | 408 331 | 1/1925 |

(Continued)

OTHER PUBLICATIONS

Buonocore et al. Ab initio calculations of electron affinity and ionizatiohn potential of carbon nanotubes, Sep. 24, 2008, Nanotechnology, 19, pp. 1-6.*

(Continued)

*Primary Examiner* — Zeev V Kitov
(74) *Attorney, Agent, or Firm* — Philip Y. Dahl

(57) ABSTRACT

A lightning protection system is provided, typically for use on an outer surface of an aircraft, which includes the use of a lightning protection sheet that includes an electrically conductive film patterned into a plurality of hill features. The lightning protection sheet may additionally include an electrically non-conductive discriminator layer over the electrically conductive film.

19 Claims, 3 Drawing Sheets

(56) References Cited

U.S. PATENT DOCUMENTS

| | | | |
|---|---|---|---|
| 5,127,601 A | 7/1992 | Schroeder | |
| 5,132,168 A | 7/1992 | Meyn et al. | |
| 5,133,516 A | 7/1992 | Marentic et al. | |
| 5,152,917 A | 10/1992 | Pieper et al. | |
| 5,445,861 A | 8/1995 | Newton et al. | |
| 6,835,412 B2 * | 12/2004 | Burke | 427/116 |
| 6,986,853 B2 * | 1/2006 | Glatkowski et al. | 264/36.19 |
| 7,277,266 B1 | 10/2007 | Le et al. | |
| 7,396,477 B2 * | 7/2008 | Hsiao | 216/2 |
| 7,651,320 B2 * | 1/2010 | Hansen | 416/1 |
| 7,686,251 B2 * | 3/2010 | Tanner et al. | 244/132 |
| 7,864,501 B2 * | 1/2011 | Rawlings et al. | 361/216 |
| 7,869,181 B2 * | 1/2011 | Le | 361/218 |
| 2002/0192432 A1 | 12/2002 | Vermillion | |
| 2004/0067341 A1 | 4/2004 | Shartle | |
| 2004/0069895 A1 | 4/2004 | Pham et al. | |
| 2004/0126541 A1 | 7/2004 | Dietz | |
| 2004/0155150 A1 | 8/2004 | Krohmer | |
| 2006/0051592 A1 | 3/2006 | Rawlings et al. | |
| 2006/0143920 A1 | 7/2006 | Morrison et al. | |
| 2007/0093163 A1 | 4/2007 | Brown | |
| 2007/0141927 A1 | 6/2007 | Brown | |
| 2007/0201179 A1 | 8/2007 | Heeter | |
| 2007/0230085 A1 | 10/2007 | Le | |
| 2007/0236855 A1 | 10/2007 | Le et al. | |
| 2007/0258182 A1 | 11/2007 | Morrill et al. | |
| 2008/0075954 A1 * | 3/2008 | Wardle et al. | 428/339 |
| 2008/0142238 A1 | 6/2008 | Rawlings | |
| 2008/0145555 A1 | 6/2008 | Kocik et al. | |
| 2008/0170349 A1 | 7/2008 | Stein | |
| 2009/0047471 A1 * | 2/2009 | Kellenberger | 428/138 |

FOREIGN PATENT DOCUMENTS

| | | |
|---|---|---|
| DE | 10 2006 046 002 A1 | 4/2008 |
| DE | 10 2007 038926 B3 | 2/2009 |
| EP | 0 163 805 A1 | 1/1985 |
| EP | 0 227 122 A2 | 7/1987 |
| EP | 0 629 549 A2 | 12/1994 |
| EP | 0 900 647 A2 | 3/1999 |
| EP | 1 011 182 A1 | 6/2000 |
| EP | 1 767 344 A2 | 3/2007 |
| EP | 1 935 631 A2 | 6/2008 |
| EP | 1 935 784 A2 | 6/2008 |
| EP | 1 944 236 A2 | 7/2008 |
| FR | 2720214 A1 | 5/1994 |
| RU | 2192991 C2 | 11/2002 |
| RU | 2217320 C1 | 11/2003 |
| RU | 2003/137750 | 6/2005 |
| WO | WO 02/076430 A1 | 10/2002 |
| WO | WO 2005/032812 A2 | 4/2005 |
| WO | WO 2007/048426 A1 | 5/2007 |
| WO | WO 2007/123700 A1 | 11/2007 |
| WO | WO 2007/142354 A1 | 12/2007 |
| WO | WO 2008/006377 A1 | 1/2008 |
| WO | WO 2008/015082 A1 | 2/2008 |
| WO | WO 2008/040936 A1 | 4/2008 |
| WO | WO 2008/046186 A1 | 4/2008 |
| WO | WO 2008/048705 A2 | 4/2008 |
| WO | WO 2008/056123 A1 | 5/2008 |
| WO | WO 2008/076851 A1 | 6/2008 |

OTHER PUBLICATIONS

Carbon Fiber-Fabric, Aug. 2008, Fiber Glast Development Corporations, http://www.fibreglast.com/category/carbon_fiber_all?gclid=CL_7Zr8zbYCFQFx4AodaRMAbA.*

Technical Report, IEC 61400-24, Wind Turbine Generator Systems—Part 24: Lightning Protection, International Electrotechnical Commission, 1st edition, Jul. 2002.

Lago, F., Gonzales J. J., Freton, P., Uhlig, F., Lucius, N. and Piau, G, P., "A Numerical Modeling of An Electric Arc and Its Interaction With the Anode: Part III. Application to the Interaction of a Lightning Strike and an Aircraft in Flight", Journal of Physics D: Appled Physics. 39, 2006, pp. 2294-2310.

SAE Aerospace ARP5412 Revision A, Aircraft Lightning Environment and Related Test Waveforms, SAE International, Nov. 1, 1999.

Form PCT/ISA/210; International Application No. PCT/US2010/031263, International Filing Date Apr. 15, 2010, (5 pages).

* cited by examiner

LIGHTNING PROTECTION SHEET WITH PATTERNED CONDUCTOR

CROSS REFERENCE TO RELATED APPLICATION

This application claims the benefit of U.S. Provisional Patent Application No. 61/170,352, filed Apr. 17, 2009, the disclosure of which is incorporated by reference herein in its entirety.

FIELD OF THE DISCLOSURE

This disclosure relates to a lightning protection sheet which includes an electrically conductive film patterned into a plurality of hill features, typically for use on an outer surface of an aircraft.

BACKGROUND OF THE DISCLOSURE

The lightning strike of an aircraft in flight is not a rare phenomenon. It is estimated that strikes on civilian transport planes amount to about one strike per plane per year. The current trend in aeronautical engineering is to use lighter weight materials, fewer mechanical systems and more electronic systems. Electronic systems are often more sensitive than mechanical systems to electromagnetic disturbances such as those generated by lightning. Recently, electrically non-conductive or partially conductive fiber reinforced resin matrix materials are being used to fabricate more parts for airplanes, as well as for wind generators, automobiles, sporting goods, furniture, buses, trucks and other applications where stiff, light-weight materials, or consolidation of parts are beneficial. These lighter weight structures offer less effective protection against lightning than the traditional aluminum structures.

Conditions at the lightning attachment site are extreme. For lightning attachments to aircraft, electrical current transients as high as 200,000 amperes are expected with charge transfers exceeding 200 coulombs. (SAE ARP5412 Revision A, Aircraft Lightning Environment and Related Test Waveforms, SAE International, 1 Nov. 1999.) Lightning attachments to wind generators vary greatly by geographic location and height, but electrical current transients as high as 100,000 amperes are expected with charge transfers as high as 300 coulomb. (Technical Report 61400-24, Wind Turbine Generator Systems—Part 24: Lightning Protection, International Electrotechnical Commission, $1^{st}$ edition 2002-07.) The temperature of the plasma in the lightning strike column has been estimated to be about 28,000°K. ("A numerical modeling of an electric arc and its interaction with the anode: part III. Application to the interaction of a lightning strike and an aircraft in flight," F Lago, J J Gonzalez, P Freton, F Uhlig, N Lucius and G P Piau 2006 J. Phys. D: Appl. Phys. 39 2294-2310.) Much of the damage caused by a lightning strike is the result from extreme levels of heat at the strike location caused by the elevated temperature within the lightning arc and ohmic heating of the materials.

Some investigators report the use of lightning protection systems which include conductive layers such as metalized woven fabric, metalized paper, solid metal films, foraminous metal films, metal wires, metal mesh, metal particles, expanded metal foils, carbon particles or carbon fibers. Some investigators report the use of lightning protection systems which include ionizable outer layers, such as paint layers. Strikes frequently destroy the protection mechanism at the attachment sites and cause measureable damage to modern light weight structures. This necessitates costly structural repair and related service interruption. The following references may be relevant to such technologies: WO 2005/032812 A, US 2006/051592 A1, WO 2007/048426 A, US 2008/142238 A1, US 2004/0069895, U.S. Pat. No. 4,920,163, EP 0227122 A, U.S. Pat. No. 7,277,266 B1, US 2007/0236855 A1, WO 2007/123700 A1, US 2007/0230085 A1, EP 1,935,784 A2, WO 2008/040936 A1, U.S. Pat. No. 4,352,142, WO2008/076851 A1, US 2007/0141927 A1, US 2008/0145555 A1, EP 1,944,236 A2, US 2008/0170349 A1, FR 2,720,214 A1, US 2007/0258182 A1, US 2007/0093163 A1, US 2007/0201179 A1, U.S. Pat. Nos. 5,127,601, 3,989,984, WO 2008/015082 A1, WO 2008/006377 A1, WO 2008/046186 A1, WO 2007/142354 A1, WO 2008/048705 A2, WO 2008/056123 A1, EP 1,935,631 A3, RU 2,263,581, RU 2,217,320 C1, WO 2002/076430 A, RU 2,192,991 C, EP 1,011,182 A1, EP 0,900,647 A, EP 629,549 A, DE 10 2006 046 002 B4, EP 163,805 A1, U.S. Pat. Nos. 5,132,168 A, 3,755,713 A and US 2006/0143920 A1.

SUMMARY OF THE DISCLOSURE

Briefly, the present disclosure provides a lightning protection sheet comprising a substantially continuous electrically conductive film having a thickness t, where the electrically conductive film is patterned into a plurality of hill features having a height h greater than t, in some embodiments greater than 3 times t and in some embodiments greater than 10 times t. In some embodiments, t is between 0.001 and 100 microns. In some embodiments, t is between 0.01 and 10 microns. In some embodiments, h is between 6 microns and 1 mm. In some embodiments, the lightning protection sheet contains an amount of electrically conductive material weighing less than 50 g/m². In some embodiments the lightning protection sheet includes no electrically conductive layer other than substantially continuous electrically conductive films as described above, which have a thickness t and are patterned into a plurality of hill features having a height h greater than t. In some embodiments the lightning protection sheet includes no electrically conductive layer other than substantially continuous electrically conductive films having a thickness between 0.001 and 100 microns. In some embodiments the lightning protection sheet includes no electrically conductive layer other than substantially continuous electrically conductive films having a thickness between 0.01 and 10 microns. The lightning protection sheet may additionally include an electrically non-conductive support layer underneath the continuous electrically conductive film, where the support layer has an upper surface that has substantially the same pattern of hill features as the electrically conductive film. The lightning protection sheet may additionally include an electrically non-conductive discriminator layer over the electrically conductive film. In some embodiments, the discriminator layer may cover portions of the electrically conductive film, where the hill features comprise tops which are not covered by the discriminator layer. In some embodiments, the discriminator layer may cover the electrically conductive film. The lightning protection sheet may additionally include an adhesive layer. The lightning protection sheet may additionally include no adhesive layer. The lightning protection sheet may additionally include one or more ionizable paint layers.

In another aspect, the present disclosure provides a composite aircraft structure bearing the lightning protection sheet described above.

This disclosure generally concerns a lightning protection "sheet" comprising various "layers" and/or "films," the lightning protection sheet providing protection to a "structure," typically a surface of an aircraft or spacecraft.

As used herein with regard to a film or layer, "substantially continuous" means not having a repeating pattern of holes or gaps that penetrate through the film or layer other than accidental or incidental holes or gaps such as for fasteners, passageways, and the like. With regard to a film or layer, "essentially continuous" means having no holes or gaps that penetrate through the film or layer other than accidental or incidental holes or gaps such as for fasteners, passageways, and the like.

As used herein with regard to a film, "thickness" means average thickness measured orthogonal to the plane of film, regardless of any patterning of the film, and where appropriate may be taken to be the nominal thickness of a film used in the practice of the present disclosure before patterning.

As used herein, a "hill feature" in a film or layer means a local maximum in height surrounded by areas of lower height, height being measured orthogonal to the general plane of the sheet (i.e., regardless of bends or curves that follow bends or curves in the underlying surface), with positive height being in the direction away from the structure side of the sheet. Hill features may include, without limitation, cones, hemispheres, humps, pyramids of 3, 4 or more sides, or hard- or soft-edged frusta of any of the forgoing. As used herein, the height h of a hill feature means the difference in height between the local maximum and the adjacent local minima of height, averaged over 360 degrees. In some embodiments, hill features may also include, without limitation, dimpled frusta, e.g., "volcano" or bisected torus shapes, in which case the height h of the hill feature is measured at the rim of the hill feature.

As used herein, a "valley feature" in a film or layer means a local minimum in height surrounded by areas of greater height. Valley features may include, without limitation, inverted cones, inverted hemispheres, inverted humps, inverted pyramids of 3, 4 or more sides, or inverted hard- or soft-edged frusta of any of the forgoing. As used herein, the depth d of a valley feature means the difference in height between the local minimum and the adjacent local maxima of height, averaged over 360 degrees. In some embodiments, valley features may also include, without limitation, inverted dimpled frusta, in which case the depth d of the valley feature is measured at the deepest point(s) of the valley feature.

As used herein, "ridge-and-trench features" in a film or layer comprise alternating ridges and trenches, which may be linear, curved or angled. In some embodiments, ridge-and-trench features may be branching. In some embodiments, ridge-and-trench features may form closed figures. As used herein, the height h of a ridge feature at a given point on a ridge means the difference in height between the local maximum and the average of the adjacent local minima of height along a line perpendicular to the ridge at that point. As used herein, the depth d of a trench feature at a given point on a trench means the difference in height between the local minimum and the average of the adjacent local maxima of height along a line perpendicular to the trench at that point.

As used herein, "electrically conductive" means having a high electrical conductivity, as least as high as is characteristic of metals in their metallic state, such as copper, aluminum, nickel, zinc, silver, gold, titanium, chromium, platinum, beryllium, magnesium, iron, and the like.

As used herein, "electrically non-conductive" means having a low electrical conductivity at room temperature, less than is characteristic of metals in their metallic state, typically including room-temperature semiconductors and insulators but in some embodiments including only room-temperature insulators and not semiconductors.

DETAILED DESCRIPTION

The present disclosure provides a lightning protection system including lightning protection sheet which includes an electrically conductive film patterned into a plurality of hill features, typically for use on an outer surface of an aircraft. Typically, an aircraft using the lightning protection system of the present disclosure can bear a lightning strike without requiring repair that necessitates a service interruption. Typically, an aircraft using the lightning protection system of the present disclosure can bear a lightning strike without damage to the aircraft structure. In some embodiments, an aircraft using the lightning protection system of the present disclosure can bear a lightning strike without damage to the electrically conductive film of the lightning protection sheet.

Figure 1:
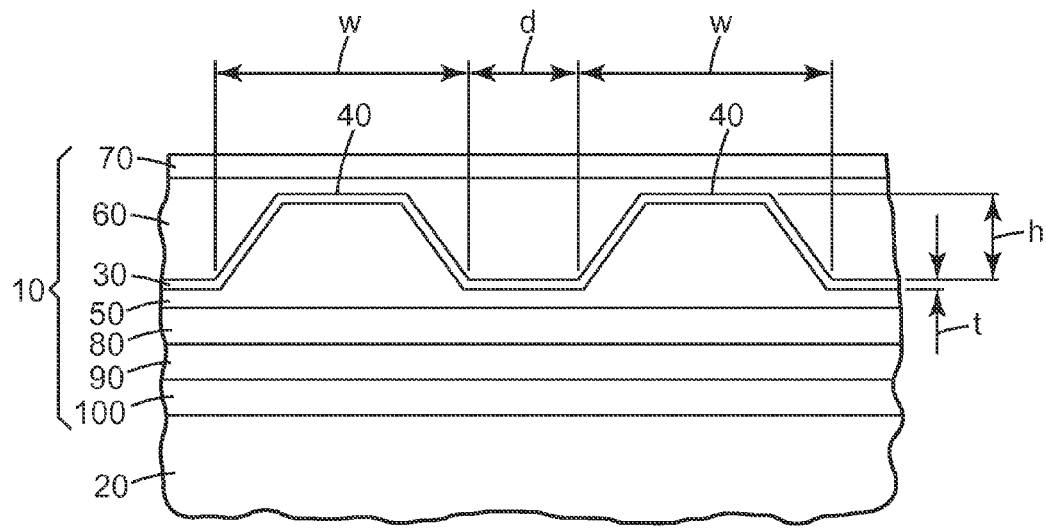
FIG. 1 is a schematic cross-section of a lightning protection system according to the present disclosure.
Figure 2:
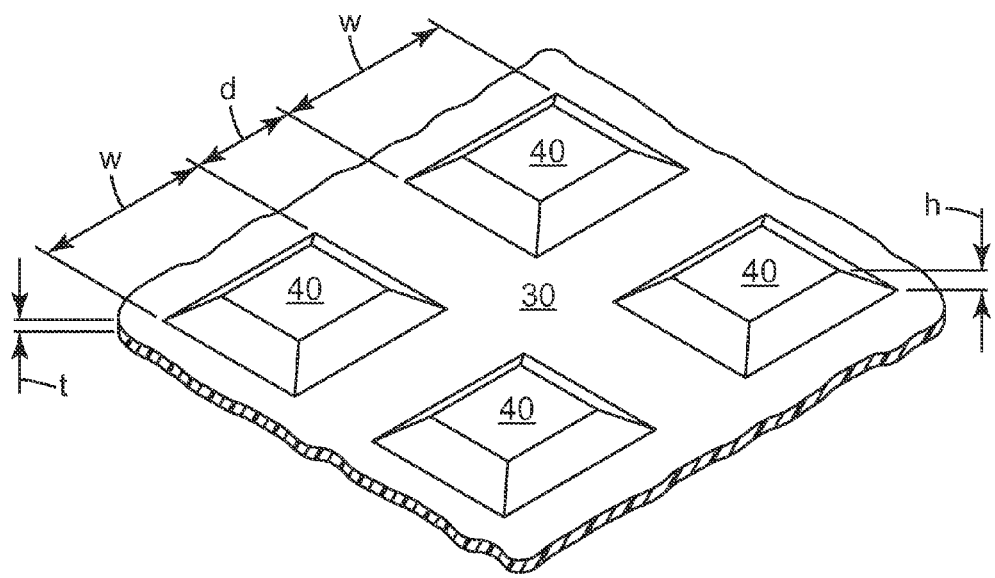
FIG. 2 is an orthogonal projection of a section of a film patterned into a plurality of hill features according to the present disclosure.

With reference to FIGS. 1 and 2, the lightning protection system according to the present disclosure may comprise a lightning protection sheet 10 borne on a structure 20 which is typically a surface of an aircraft or spacecraft. Lightning protection sheet 10 includes electrically conductive film 30 having thickness t patterned into a plurality of hill features 40 having height h. In the embodiment depicted in FIGS. 1 and 2, the hill features are rectangular (square) frusta having a width w and being separated by a distance d. In some of the embodiments addressed in the Examples below, the hill features are rectangular frusta similar to those depicted in FIGS. 1 and 2 except that d is essentially zero and w varies in both x and y directions between 11 and 15 mils (0.28-0.38 mm). In some of the embodiments addressed in the Examples below, the average height h of the rectangular frusta is 25 mil (0.635 mm) and the flat tops of the rectangular frusta have an average width of about 4 mil (0.1 mm). In other embodiments, the hill features may be cones, hemispheres or humps. In other embodiments, the hill features may be pyramids of 3, 4 or more sides. In other embodiments, the hill features may be hard- or soft-edged frusta of cones, hemispheres or humps. In other embodiments, the hill features may be hard- or soft-edged frusta of pyramids of 3, 4 or more sides. In other embodiments, the hill features may be dimpled frusta or any of the foregoing, e.g., "volcano" or bisected torus shapes. The distribution of hill features 40 may be ordered, repetitive, chaotic, random, or combinations thereof.

Electrically conductive film 30 may be made of any suitable material. Typically electrically conductive film 30 comprises a metallic material. Typically electrically conductive film 30 comprises metal. Typically electrically conductive film 30 comprises a material having a favorable balance of properties including high electrical conductivity, low density and high resistance to corrosion. Useful metals may include, without limitation, copper, aluminum, nickel, zinc, silver, gold, titanium, chromium, platinum, beryllium, magnesium, iron, and the like, as well as metal alloys thereof. Typically, electrically conductive film 30 is substantially continuous. In some embodiments, electrically conductive film 30 is essentially continuous. In some embodiments, electrically conductive film 30 is continuous.

The thickness t of the electrically conductive film 30 may be any suitable thickness. Lower thicknesses may yield lower weight. Thickness t is typically less than 1 mm, more typically less than 100 microns, more typically less than 50 microns and typically less than 10 microns. In some embodiments, thickness t is less than 5 microns. In some embodiments, thickness t is less than 2 microns. In some embodiments, thickness t is less than 1 micron. Thickness t is typically at least 0.001 micron, more typically at least 0.01 micron and more typically at least 0.1 micron.

The height h of hill features 40 is greater than the thickness t of the electrically conductive film 30. More typically, height h is greater than 1.5 times t. More typically, height h is greater than 2 times t. More typically, height h is greater than 3 times t. More typically, height h is greater than 5 times t. More typically, height h is greater than 10 times t. More typically, height h is greater than 20 times t. More typically, height h is greater than 50 times t. More typically, height h is greater than 100 times t.

The height h of hill features 40 may be any suitable height. The height h of hill features 40 is typically between 0.1 microns and 10 mm, more typically between 1 micron and 2 mm, and more typically between 6 microns and 1 mm. The width w of hill features 40 may be any suitable width. The width w of hill features 40 is typically between 1 micron and 50 mm, more typically between 10 microns and 10 mm, and more typically between 20 microns and 1 mm. The pitch p of the hill features is equal to width w plus distance d between hill features. The pitch p of the hill features 40 may be any suitable pitch. The pitch p of hill features 40 is typically between 10 microns and 50 mm, more typically between 50 microns and 10 mm, and more typically between 200 microns and 1 mm.

Structure 20 may be of any suitable material, typically a material used in aircraft or wind turbine construction, which may include, without limitation, metal, wood, polymer, carbon particles or fibers, glass particles or fibers, composites including one or more of the above, and the like.

With reference to FIGS. 1 and 2, the lightning protection system according to the present disclosure may optionally comprise support layer 50 which supports electrically conductive film 30. In some embodiments the support layer 50 conforms to the underside of the electrically conductive film 30. In some embodiments (not shown) the support layer 50 fills only the underside of hill features 40 and does not extend below electrically conductive film 30. Support layer 50 may be made of any suitable material. Typically, support layer 50 is made of an electrically non-conductive material, such as, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, silicone and may include additives or combinations of additives including barium titanate, lead titanate, strontium titanate, barium stannate, barium strontium titanate, barium zirconate, cesium oxide, lanthanum oxide, titanium oxide, zinc oxide, carbon, silica or aramid. In some embodiments support layer 50 contains no adhesive. In some embodiments support layer 50 contains no uncured polymer. In some embodiments support layer 50 contains no pressure sensitive adhesive.

With reference to FIGS. 1 and 2, the lightning protection system according to the present disclosure may optionally comprise discriminator layer 60 above electrically conductive film 30. In some embodiments discriminator layer 60 conforms to the upper side of the electrically conductive film 30. In some embodiments (not shown) the support layer 50 fills only the volume between hill features 40 and does not cover the tops of hill features 40. Discriminator layer 60 may be made of any suitable material. Typically, discriminator layer 60 is made of an electrically non-conductive material, typically with a high dielectric breakdown strength, typically higher than air, more typically higher than 5 kV/mm, more typically higher than 10 kV/mm, and in some embodiments higher than 25 kV/mm. Useful materials may include, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, and may include additives or combinations of additives including barium titanate, lead titanate, strontium titanate, barium stannate, barium strontium titanate, barium zirconate, cesium oxide, lanthanum oxide, titanium oxide, zinc oxide, carbon, silica or aramid.

With reference to FIGS. 1 and 2, the lightning protection system according to the present disclosure may optionally comprise one or more additional surfacing layers 70, such as paint layers. Additional surfacing layers 70 may be made of any suitable material, including without limitation patterned or unpatterned paints. In one embodiment, the lightning protection system according to the present disclosure includes one or more additional surfacing layers 70 which are ionizable paint layers. Such ionizable paint layers contain components which vaporize upon application of heat or electric current such as is present during a lightning strike and thereby provide an electrically conductive vapor above the lightning protection sheet in the area of the strike which may momentarily reduce the resistance to migration of the strike attachment point to other locations. Such components may include, without limitation, ionizable pigments such as titanium dioxide, zinc oxide, tin oxide, zinc orthotitanate, iron oxide, chromium oxide, cesium acid tartrate, barium oxalate, cesium salt, barium salt, or cesium tartrate. In some embodiments, additional surfacing layers 70 are made of materials having a lower dielectric breakdown strength than discriminator layer 60, typically less than 90% of dielectric breakdown strength of discriminator layer 60, more typically less than 75% of dielectric breakdown strength of discriminator layer 60, and more typically less than 50% of dielectric breakdown strength of discriminator layer 60. Additional surfacing layers 70 may have an exterior surface which is generally planar (as shown) or structured (not shown), e.g., in the form of uniform or non-uniform riblets or scales. Such patterned structures may be used to reduce frictional drag as taught, e.g., in U.S. Pat. No. 5,133,516, to reduce noise, or for other purposes.

In some embodiments, the functions and characteristics of discriminator layer 60 and additional surfacing layer 70 may be combined in a single layer. In some embodiments, discriminator layer 60 and additional surfacing layer 70 must have different compositions.

With reference to FIGS. 1 and 2, the lightning protection system according to the present disclosure may optionally comprise one or more additional electrically conductive layers 80. Additional electrically conductive layers 80 may be made of any suitable material, typically a metallic material, more typically a metal. Typically electrically conductive layers 80 comprise a material having a favorable balance of properties including high electrical conductivity, low density and high resistance to corrosion. Typical metals may include, without limitation, copper, aluminum, nickel, zinc, silver, gold, and the like as well as metal alloys thereof. In some embodiments, additional electrically conductive layer 80 may be separated from electrically conductive film 30 by support layer 50. In some embodiments (not shown), additional electrically conductive layer 80 may be in electrical contact with electrically conductive film 30. In some embodiments, the lightning protection system according to the present disclosure comprises no additional electrically conductive layers 80. In some embodiments, the lightning protection system according to the present disclosure comprises no electrically conductive layer that is not patterned into a plurality of hill features having a height h greater than t, more typically greater than 2 t, more typically greater than 10 t, and more typically greater than 20 t. In some embodiments, the lightning protection system according to the present disclosure comprises no electrically conductive layer that is not a substantially continuous electrically conductive film patterned into a plurality of hill features having a height h greater than t, more typically greater than 2 t, and more typically greater than 10 t. In some embodiments, the lightning protection system according to the present disclosure comprises no electrically conductive layer that is not an essentially continuous electrically conductive film patterned into a plurality of hill features having a height h greater than t, more typically greater than 2 t, more typically greater than 10 t, and more typically greater than 20 t.

With reference to FIGS. 1 and 2, the lightning protection system according to the present disclosure may optionally comprise one or more additional non-conductive layers 90. Additional non-conductive layers 90 may be useful to provide additional insulation against the transmission of electric current, heat, or both. Additional non-conductive layers 90 may be useful where the underlying structure 20 is electrically conductive and/or galvanically incompatible with materials used in a lightning protection system of this present invention. Additional non-conductive layers 90 may be made of any suitable materials, including, without limitation, ceramic, polymeric or textile materials or combinations thereof which may additionally contain particulate, fibrous or shaped fillers. Useful materials may additionally include, without limitation: epoxy, polyurethane, polyimide, polyester, polyethylene, polycarbonate, polyacrylate, fluoropolymer, silicone, and may include additives or combinations of additives including barium titanate, lead titanate, strontium, titanate, barium stannate, barium strontium titanate, barium zirconate, cesium oxide, lanthanum oxide, titanium oxide, zinc oxide, carbon, silica or aramid. In some embodiments additional non-conductive layer 90 contains no adhesive. In some embodiments additional non-conductive layer 90 contains no uncured polymer. In some embodiments additional non-conductive layer 90 contains no pressure sensitive adhesive.

With reference to FIGS. 1 and 2, the lightning protection system according to the present disclosure may optionally comprise one or more adhesive layers 100. Adhesive layer 100 may be made of any suitable adhesive materials, including, without limitation, pressure sensitive adhesives, hot melt adhesives, curable adhesives, and the like, which may include epoxy, polyurethane, polyacrylate, polysulfide, polythioether or silicone adhesives. In some embodiments, the lightning protection system according to the present disclosure comprises no adhesive layer. In embodiments where the lightning protection sheet includes an adhesive layer, the sheet may be provided with a release liner (not shown) to be removed from the adhesive layer prior to application of the sheet to the structure. In some embodiments, the sheet may be provided with a liner (not shown) to protect either or both surfaces from contamination, handling damage or distortion which is to be removed from the sheet prior to or after application of the sheet to the structure.

In some embodiments, the functions and characteristics of support layer 50 and additional non-conductive layer 90 may be combined in a single layer. In some embodiments, support layer 50 and additional non-conductive layer 90 must have different compositions. In some embodiments, the functions and characteristics of support layer 50 and adhesive layer 100 may be combined in a single layer. In some embodiments, support layer 50 and adhesive layer 100 must have different compositions. In some embodiments, the functions and characteristics of additional non-conductive layer 90 and adhesive layer 100 may be combined in a single layer. In some embodiments, additional non-conductive layer 90 and adhesive layer 100 must have different compositions. In some embodiments, the functions and characteristics of support layer 50, additional non-conductive layer 90 and adhesive layer 100 may be combined in a single layer. In some embodiments, support layer 50, additional non-conductive layer 90 and adhesive layer 100 must have different compositions.

Typically, the lightning protection sheet of the present disclosure is lightweight. In some embodiments, the lightning protection sheet weighs less than 100 g/m$^2$, in some embodiments less than 50 g/m$^2$, in some embodiments less than 25 g/m$^2$, in some embodiments less than 15 g/m$^2$, and in some embodiments less than 10 g/m$^2$. The lightning protection sheet typically weighs at least 1 g/m$^2$. In some embodiments, the lightning protection sheet contains an amount of electrically conductive material weighing less than 50 g/m$^2$, in some embodiments less than 35 g/m$^2$, in some embodiments less than 20 g/m$^2$, in some embodiments less than 10 g/m$^2$, in some embodiments less than 4 g/m$^2$. The lightning protection sheet typically contains at least 0.5 g/m$^2$ of electrically conductive material. In some embodiments, the electrically conductive film patterned into a plurality of hill features which forms a component of the lightning protection sheet weighs less than 50 g/m$^2$, in some embodiments less than 35 g/m$^2$, in some embodiments less than 20 g/m$^2$, in some embodiments less than 10 g/m$^2$, in some embodiments less than 4 g/m$^2$. The electrically conductive film patterned into a plurality of hill features which forms a component of the lightning protection sheet typically weighs at least 0.5 g/m$^2$.

Without wishing to be bound by theory, the authors believe that the lightning protection system according to the present disclosure can function to prevent damage to aircraft structure and/or to itself during a lightning strike by encouraging multiplicity of attachment points and by encouraging rapid attachment point migration. In some embodiments, the characteristics of specific heat, thermal conductivity, density, thickness or area, electrical conductivity and vaporization temperature of the electrically conductive film can combine such that, during lightning attachment to a lightning attachment point (typically a hill feature), the electrical conductance of the electrically conductive film at or surrounding the lightning attachment point drops rapidly (typically due to heating) until the conductance becomes less through the conductor than it is through the adjacent discriminator(s), coating (s) and/or air. In some embodiments, the use of ionizable outer layers may enhance this effect by temporarily increasing conductivity in the air near an attachment point at the moment of a lightning strike. In some embodiments, this causes attachment point migration before the temperature of the electrically conductive film rises above its vaporization temperature. In some embodiments, this causes attachment point migration before the temperature of the material of the underlying aircraft structure rises above its vaporization temperature. In some embodiments, this causes attachment point migration before the temperature of the material of the underlying aircraft structure rises above its glass transition temperature. In some embodiments, this causes attachment point migration before the temperature of the material of the underlying aircraft structure rises above its damage threshold temperature.

The lightning protection system according to the present disclosure may be make by any suitable method. In some embodiments, a lightning protection sheet according to the present disclosure is made as an appliqué and attached to a pre-existing aircraft part. In some such embodiments, the lightning protection sheet may include an adhesive layer for attachment to the part. In some embodiments, a lightning protection sheet according to the present disclosure is incorporated into an aircraft part during manufacture of the part. In some embodiments, a lightning protection sheet according to the present disclosure is manufactured during manufacture of an aircraft part as integral to the part.

In some embodiments where a lightning protection sheet according to the present disclosure protects a composite part, the lightning protection sheet is laid up in a tool along with layers of prepreg or similar composite components prior to cure, so that the lightning protection sheet becomes integral to the part. Typically, the lightning protection sheet would be the first layer laid up in the tool or the last layer laid up in the tool so as to form the outermost layer of the part. In some such embodiments, the lower-most layer of the lightning protection sheet, farthest from the outer surface of the part, comprises an adhesive, which in some embodiments may be an uncured polymer, in some embodiments may be a partially cured polymer, or in some embodiments may be a curable polymer. In some such embodiments, the lower-most layer of the lightning protection sheet, farthest from the outer surface of the part, comprises no adhesive. In some such embodiments, the lower-most layer of the lightning protection sheet, farthest from the outer surface of the part, comprises no uncured polymer.

The electrically conductive film patterned into a plurality of hill features according to the present disclosure may be made by any suitable method. In some embodiments, a pre-existing film may be patterned by any suitable method, such as stamping, embossing, calendaring, molding, machining or the like. The film so patterned may then be combined with other layers by any suitable means, which may include introducing layers of solid material, layers of malleable material, liquids, solutions or suspensions of materials, or the like, by lamination, coating, spray application, printing methods, or the like. In some embodiments, a support layer may be patterned by any suitable method, such as stamping, embossing, calendaring, molding, machining or the like, and the material of the electrically conductive film may be added to the patterned support layer by any suitable method, including chemical deposition, electrodeposition, vapor deposition, application of foil, and the like. Additional layers may be added in any suitable form, such as layers of solid material, layers of malleable material, liquids, solutions or suspensions of materials, or the like, by lamination, coating, spray application, printing methods, or the like.

The lightning protection system of the present disclosure may be used to make parts for air vehicles, space vehicles, wind generators, automobiles, buses, trucks, or any other application where lightning protection, electromagnetic interference shielding or static charge management are required on otherwise electrically non-conductive or partially conductive materials. The lightning protection system of the present disclosure may also be applied to electrically conductive parts for air vehicles, space vehicles, wind generators, automobiles, buses, trucks, or any other application where improved lightning protection, electromagnetic interference shielding or static charge management are desired.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Examples 1C-5C (Comparative) and 6-9

General Tooling and Bagging of a Composite Part

Composite specimens with a curable epoxy adhesive resin were prepared for curing in the following manner. A flat tool was fabricated by trimming to 2 ft×2 ft (0.61 m×0.61 m) a sheet of 12 gauge stainless steel alloy 304 with 2B finish. A 1 mil (25 micron) PTFE non-perforated parting film (available as HTF-621 from Northern Fiber Glass Sales, Inc.) was applied to the tool and affixed thereon with heat resistant tape applied at the edges and corners of the film. Each layer of material was applied to the tool in the order and arrangement described in the example text. Each layer was applied first to the tool, then one upon the other without liners by hand and each layer was consolidated with the previous layer(s) by passing a 1.5 inch (3.8 cm) diameter wooden roller over the upper-most layer while applying hand pressure to the roller. After every forth ply, the part and tool were covered with a layer of perforated parting film described below and then a layer of breather ply described below and the part was compacted to the tool under full vacuum in a Scotchlite™ Vacuum Applicator Model VAL-1 manufactured by 3 M for 3 minutes after which time the breather ply and perforated parting film were removed and additional plies were added to the part. Each coupon was permanently marked by applying a unique identifier along one edge of the part on the exposed face of the part using a Pilot Silver Marker. A peel ply available as 60001/049/0009 from Precision Fabrics Group was applied wrinkle-free so as to completely cover the exposed face of the coupon. A perforated parting film available as A5000 from Richmond Aircraft Products was applied wrinkle-free so as to completely cover the coupon. A thermocouple was attached to the tool within 2 inches of the coupon. A layer of non-perforated parting film was applied to the bed of the autoclave described below to cover the area where the tools were placed. The tool and part were placed on the bed of the autoclave described below and a continuous bead of vacuum bag sealing tape was applied directly to the bed of the autoclave so that the distance from the tape to the tool was at least 3 inches. The exposed non-perforated parting film on the bed of the autoclave was folded or trimmed clear of the vacuum bag sealing tape. A non-woven polyester 10 oz/yd² felt breather ply (available as RC-3000-10 from Richmond Aircraft Products) was overlaid upon the part and the tool and onto the bed of the autoclave such that it extended to within 2 inches of the vacuum bag sealing tape on all sides. A 3 mil high temperature nylon bagging film (available as HS8171 from Richmond Aircraft Products) was placed loosely over the bed of the autoclave to cover the part and tools and to extend to or beyond the vacuum bag sealing tape on all sides. At least 1 vacuum port assembly was installed in the vacuum bag over the breather ply and the vacuum bag was sealed to the bed of the autoclave along all edges by pressing the film against the vacuum bag seal tape.

Curing of a Composite Part

Composite specimens with a curable epoxy adhesive resin were cured in the following manner. Each composite specimen with a curable epoxy adhesive resin was prepared for curing according to "General Tooling and Bagging of a Composite Part," above. The vacuum port assembly(ies) was attached to the vacuum system in the autoclave described below and the parts, tools, parting films and breather plies were consolidated under full vacuum for a minimum of 5 minutes. The thermocouples were attached to the vacuum system in the autoclave. The part was then cured under controlled temperature and pressure conditions in one of two autoclaves, one made by Thermal Equipment Corporation or the other made by ASC Process Systems, using pressure and temperature profiles described below. The pressure inside the autoclave was increased to 80 psi and the temperature was increased at 5° F./minute until the temperature of the lagging thermocouple reached 177° C. The pressure was maintained between 80 psi and 90 psi and the temperature was maintained between 177° C. and 182° C. for 120 minutes. The temperature was reduced at a controlled rate of 5° F./minute until the temperature of the lagging thermocouple reached 44° C. The pressure was maintained between 80 psi and 90 psi until the temperature of the lagging thermocouple reached 66° C., then the pressure in the autoclave and the vacuum under the vacuum bag was vented to the atmosphere. The cured composite specimen was removed from the autoclave, bagging and tool.

Example 1C (Comparative)

Figure 3A:
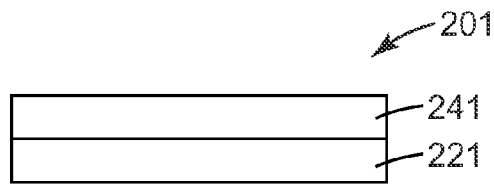
FIGS. 3A-3E are schematic cross-sections of lightning protection systems according to the prior art, as discussed in Comparative Examples 1C-5C below.

Carbon Fiber Reinforced Plastic Composite Structure with Polyurethane-Impregnated Expanded Aluminum Foil Applied After Cure With reference to FIG. 3A, an epoxy resin impregnated carbon fiber, polyurethane resin and an expanded aluminum foil were provided and used to prepare comparative composite specimen (201). A cured carbon fiber reinforced plastic panel (221) was provided as follows. The following materials were assembled and prepared as described in "General Tooling and Bagging of a Composite Part" above. Applied to the tool were 13 plies epoxy resin impregnated unidirectional graphite fibers available as P2353U 19 152 from Toray. The curable resins in this assembly were cured as described in "Curing of a Composite Part" above. A layer comprising conductive mesh 241 was bonded to the surface as follows. A 4 mil thick expanded aluminum foil available as Exmet 4AL8-080 from Dexmet was placed flat on the part and saturated with polyurethane resin provided in the following manner. A polymer solution was prepared. More specifically, 50 parts of Caprolactone Diol available as Tone 2221 from Dow Chemical, 41 parts 4,4-methylenedicyclohexl diisocyanate available from Degussa, 9 parts 1,4-butanediol available from Sigma-Aldrich and <1 part Di-n-butyltin dilaurate available from Alfa-Aesar were added to a one liter, narrow-mouthed bottle. The solution was mixed by stirring with a wooden tongue depressor for 3 minutes at ambient conditions (22° C.; 50 percent Relative Humidity). The solution was generously cast onto the metal mesh and a polyester liner was made to cover the resin and the entire surface. A plastic applicator such as available as PA-1 from 3 M was used to spread the solution between the polyester liner and the plastic panel to impregnate the metal mesh and exclude excess resin. The polyurethane resin was allowed to cure for 24 hours at ambient conditions (22° C.; 50 percent Relative Humidity).

Example 2C (Comparative)

Figure 3B:
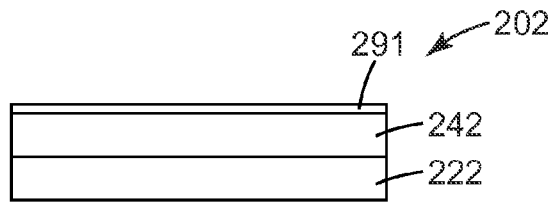

Carbon Fiber Reinforced Plastic Composite Structure with Layer Having Interwoven Wire Applied Before Cure With reference to FIG. 3B, an epoxy resin impregnated carbon fiber, interwoven phosphor-bronze wire and polyurethane paint were provided and used to prepare a composite specimen (202). A cured carbon fiber reinforced plastic panel was provided as follows. The following materials were assembled and prepared as described in "General Tooling and Bagging of a Composite Part" above. Applied first to the tool was a ply of epoxy resin impregnated woven plain weave graphite fabric with 0.10 mm (0.004 in) diameter phosphor-bronze wire interwoven with every tow of carbon fabric (~10 tows per inch) available as FL6676U-37E 965 from Toray (242). Then applied were 12 plies epoxy resin impregnated unidirectional graphite fibers available as P2353U 19 152 from Toray, forming the substrate (222). The curable resins in this assembly were cured as described in "Curing of a Composite Part" above to fabricate a cured panel. A paint coating (291) was applied to the surface of the cured panel in the following manner. First, the cured panel was wiped clean with Methyl Ethyl Ketone and allowed to dry for 10 minutes at ambient conditions (22° C.; 50 percent Relative Humidity). Then, a conductive epoxy primer coat was applied in the following manner. A polymer solution was prepared. More specifically, equal parts of conductive primer base available as 528X310 and activator available as 9910X464 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and one coat was applied to the surface using a commercially available high volume low pressure sprayer and allowed to dry to a tack-free condition at ambient conditions (22° C.; 50 percent Relative Humidity). Within 24 hours of applying the primer, a polyurethane paint coat was applied in the following manner. A polymer solution was prepared. More specifically, 2 parts of polyurethane base available as CA8800/I1050 from PPG Industries, 1 part of activator available as CA8800 from PPG Industries and 1 part of thinner available as CA8800ST1 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and one coat was applied to the surface using a commercially available high volume low pressure sprayer. The paint coating (291) was allowed to dry for 7 days minimum at ambient conditions (22° C.; 50 percent Relative Humidity).

Example 3C (Comparative)

Figure 3C:
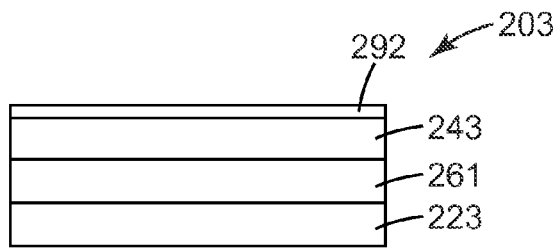

Carbon Fiber Reinforced Plastic Composite Structure with Epoxy Adhesive Film Including Expanded Copper Foil Applied Before Cure With reference to FIG. 3C, an epoxy resin impregnated carbon fiber, surfacing film with expanded copper foil and polyurethane paint were provided and used to prepare a composite specimen (203). A cured carbon fiber reinforced plastic panel was provided as follows. The following materials were assembled and prepared as described in "General Tooling and Bagging of a Composite Part" above. Applied first to the tool was a ply of epoxy adhesive film with an expanded copper foil at 0.045 lbs./ft$^2$ available as 3 M™ Scotch-Weld™ Structural Adhesive Film AF 191XS 045 from 3 M (243). Then applied was a ply of 104 glass non-woven scrim (261). Then applied were 13 plies epoxy resin impregnated unidirectional graphite fibers available as P2353U 19 152 from Toray, forming the substrate (223). The curable resins in this assembly were cured as described in "Curing of a Composite Part" above to fabricate a cured panel. A paint coating (292) was applied to the surface of the cured panel in the following manner. First, the cured panel was wiped clean with Methyl Ethyl Ketone and allowed to dry for 10 minutes at ambient conditions (22° C.; 50 percent Relative Humidity). Then, a conductive epoxy primer coat was applied in the following manner. A polymer solution was prepared. More specifically, equal parts of conductive primer base available as 528X310 and activator available as 9910X464 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and one coat was applied to the surface using a commercially available high volume low pressure sprayer and allowed to dry to a tack-free condition at ambient conditions (22° C.; 50 percent Relative Humidity). Within 24 hours of applying the primer, a polyurethane paint coat (292) was applied in the following manner. A polymer solution was prepared as follows. 2 parts of polyurethane base available as CA8800/I1050 from PPG Industries, 1 part of activator available as CA8800 from PPG Industries and 1 part of thinner available as CA8800ST1 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and one coat was applied to the surface using a commercially available high volume low pressure sprayer. The paint coating (292) was allowed to dry for 7 days minimum at ambient conditions (22° C.; 50 percent Relative Humidity).

Example 4C (Comparative)

Figure 3D:
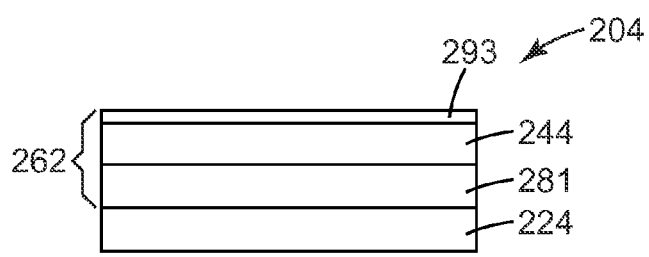

Carbon Fiber Reinforced Plastic Composite Structure with an Appliqué Including Expanded Aluminum Foil Applied After Cure With reference to FIG. 3D, an epoxy resin impregnated carbon fiber and a conductive appliqué were provided and used to prepare a composite specimen (204). A cured carbon fiber reinforced plastic panel (224) was provided as follows. The following materials were assembled and prepared as described in "General Tooling and Bagging of a Composite Part" above. Applied to the tool were 13 plies epoxy resin impregnated unidirectional graphite fibers available as P2353U 19 152 from Toray (224). The curable resins in this assembly were cured as described in "Curing of a Composite Part" above.

A conductive appliqué (262) comprising an adhesive layer (281), an conductive layer comprising expanded aluminum foil, which was a 4 mil thick expanded aluminum foil available as Exmet 4AL8-080 from Dexmet (244) and a surface layer (293) was made and bonded to the surface as follows.

The conductive appliqué (262) was made as follows. A gray fluoropolymer film backing was prepared by feeding a uniform mixture of pellets having 97 percent (w/w) clear DYNEON THV 500 and 3 percent (w/w) of gray pigmented DYNEON THV 200 (this pigmented material was prepared by Americhem, Incorporated, Elgin, Ill., such that the color of the resultant gray backing met the specifications for Federal Standard 595B, Color #36320) into an extruder. The pellets were extruded into a film onto a 51 mu.m. thick polyester carrier web using a Haake extruder having a screw diameter of 1.9 cm and a die width of 20.3 cm, and employing a screw speed of 165 rpm and a web speed of 15 meters/minute. The extruder die was held approximately 1.9 cm away from the carrier. The extruder had three zones that were set as follows: 224° C. in zone 1; 243° C. in zone 2; and 246° C. in zone 3. The die temperature was set at 246° C. The resulting extruded film had a thickness of 43.2 mu.m+/-12 mu.m. The resulting film backing was then treated by Acton Technologies, Inc., Pittston, Pa., using their FLUOROETCH process. Next, an acrylic polymer solution was prepared. More specifically, the following components were added to a one liter, narrow-mouthed bottle: 70 parts by weight isooctyl acrylate (IOA), 56 parts by weight ethyl acrylate, 14 parts by weight acrylic acid (AA), 260 grams ethyl acetate, and 0.42 grams benzoyl peroxide thermal initiator. This monomer solution was purged with nitrogen at a rate of 1 liter/minute for two minutes. The bottle was sealed and placed in a rotating water bath at 59 degree. C. for 24 hours. The resulting polymer solution was diluted with heptane to give a 21 percent solids solution. Next, 2.1 parts of a 5 percent (w/w) solution of N,N'-bis-1,2-propyleneisophthalamide in toluene was added, and the final polymer solution was then poured onto the treated surface of the gray fluoropolymer film backing, and coated using a knife-over-bed coating station. The gap between knife and bed was set to be 71 mu.m greater than the combined thickness of the fluoropolymer film backing and the polyester carrier web. The coated backing was dried in a 12-meter convection oven having three zones set as follows: zone 1: 41.degree. C., zone 2: 60.degree. C., and zone 3: 82.degree. C. The coated backing was passed through both the coating station and the drying oven at 1.52 meters/minute. After drying, the combined thickness of the film backing and cured adhesive was approximately 58.2 mu.m, indicating an adhesive thickness of about 15 mu.m. A 4 mil thick expanded aluminum foil available as Exmet 4AL8-080 from Dexmet was laminated into the cured polymer solution by feeding them together at a rate of 2.5 ft/min into the nip of a Geppert Engineering Inc. laminator using 4 inch rubber rollers a ambient conditions (22° C.; 50 percent Relative Humidity) to imbed the expanded aluminum foil into the cured polymer solution. An additional measure of the final adhesive polymer solution prepared above was then poured onto the exposed surface of the expanded aluminum foil, and coated using a knife-over-bed coating station to saturate and cover the expanded aluminum foil. The gap between knife and bed was set to be 381 mu.m greater than the combined thickness of the fluoropolymer film backing, the polyester carrier web and the expanded aluminum foil. The coated backing was dried in a 12-meter convection oven having three zones set as follows: zone 1: 41.degree. C., zone 2: 60.degree. C., and zone 3: 82.degree. C. The coated backing was passed through both the coating station and the drying oven at 1.52 meters/minute. After drying, the combined thickness of the film backing, expanded aluminum foil and cured adhesive polymer was approximately 254 mu.m., indicating an adhesive thickness of about 51 mu.m. A 4 mil thick polyethylene temporary protective liner was laminated to the exposed adhesive with light pressure.

The conductive appliqué (262) was applied as follows. First, the cured panel (224) was wiped clean with Isopropyl Alcohol and allowed to dry for 10 minutes at ambient conditions (22° C.; 50 percent Relative Humidity). Then, the conductive appliqué (262) was trimmed to cover the plastic panel and the protective liner was removed from the pressure sensitive adhesive on the appliqué. The adhesive side of the appliqué (262) was mated with the cleaned surface of the composite panel (224) first along one edge of the panel, then progressively across the entire surface of the panel using a plastic applicator available as PA-1 from 3 M to exclude air and ensure intimate contact of the adhesive and the substrate. The adhesion of the appliqué was allowed to build for 24 hours at ambient conditions (22° C.; 50 percent Relative Humidity).

Example 5C (Comparative)

Figure 3E:
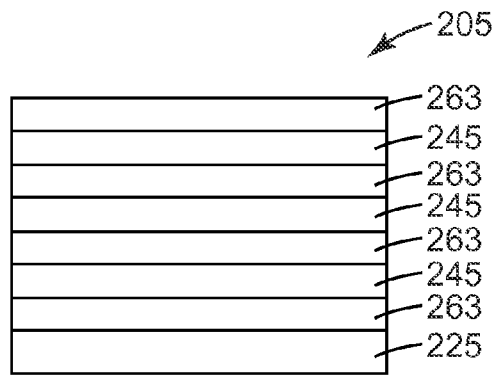

Carbon Fiber Reinforced Plastic Composite Structure with Multiple Layers of Epoxy Adhesive Film and Nickel-Coated Graphite Fiber Paper Applied Before Cure With reference to FIG. 3E, an epoxy resin impregnated carbon fiber, epoxy adhesive film and nickel coated graphite fiber non-woven paper were provided and used to prepare a composite specimen (205). A cured carbon fiber reinforced plastic panel was provided as follows. The following materials were assembled and prepared as described in "General Tooling and Bagging of a Composite Part" above. Applied first to the tool was a ply of epoxy film at 0.035 lbs./ft$^2$ available as 3 M™ Scotch-Weld™ Structural Adhesive Film AF 555U 035 from 3 M (263). Onto the adhesive was placed a 10.5 mil thick nickel coated graphite fiber non-woven paper at 47 g/m$^2$ available as Grade 8000838 nickel carbon paper from Hollingsworth & Vose (245). Additional plies of epoxy adhesive film (263) and nickel coated graphite fiber non-woven paper (245) were alternately placed one upon the other until three plies of nickel coated graphite fiber non-woven paper (245) and four plies of epoxy adhesive film (263) were in place upon the tool. Then applied were 13 plies epoxy resin impregnated unidirectional graphite fibers available as P2353U 19 152 from Toray, forming the substrate (225). The curable resins in this assembly were cured as described in "Curing of a Composite Part" above to fabricate a cured panel.

Example 6

Figure 4:
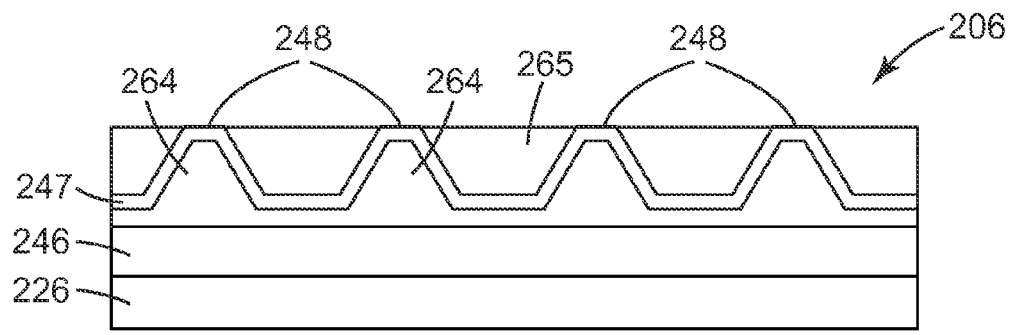
FIG. 4-7 are schematic cross-sections of lightning protection systems according to the present disclosure, as discussed in Examples 6-9 below.

Carbon Fiber Reinforced Plastic Composite Structure with Dimpled Aluminum Plate Applied Before Cure With reference to FIG. 4, an epoxy resin impregnated carbon fabric, an epoxy adhesive film and an aluminum plate having dimples were provided and used to prepare a composite specimen. A cured carbon fiber reinforced plastic panel was provided. More specifically, the following materials were assembled and prepared as described in "General Tooling and Bagging of a Composite Part" above. Applied first to the tool were 13 plies epoxy resin impregnated unidirectional graphite fibers available as P2353U 19 152 from Toray, forming the substrate (226). Then applied was a 4 mil thick expanded aluminum foil available as Exmet 4AL8-080 from Dexmet (246). Then applied were 2 plies of epoxy film at 0.035 lbs./ft$^2$ available as 3 M™ Scotch-Weld™ Structural Adhesive Film AF 555U 035 from 3 M, forming support layer (264). Onto the adhesive was placed an aluminum sheet (247), which was an 8 mil thick aluminum sheet 6061-0 per federal specification QQ-A-250/11 containing dimples (248) shaped as conical frusta 2 mm in diameter at the face and having a height of 20 mils, arranged in staggered rows and spaced at 4.5 mm center-to-center with the raised dimples facing away from the support layer (264). The curable resins in this assembly were cured as described in "Curing of a Composite Part" above. A polyurethane barrier coating (265) was applied to the surface of the cured panel in the following manner to fill entirely the space between the dimples (248) in the aluminum sheet (247). First, the surface of the aluminum on the cured panel was wiped clean with Methyl Ethyl Ketone and allowed to dry for 10 minutes at ambient conditions (22° C.; 50 percent Relative Humidity). Then a coating of polyurethane was applied in the following manner. A polymer solution was prepared. More specifically, 2 parts of polyurethane base available as CA8800/I1050 from PPG Industries and 1 part of activator available as CA8800 from PPG Industries were added to a one liter, narrow-mouthed bottle. The solution was mixed by stirring with a wooden tongue depressor for 3 minutes at ambient conditions (22° C.; 50 percent Relative Humidity). The solution was generously cast onto the aluminum. A plastic applicator such as available as PA-1 from 3 M was used to spread the solution across the panel to fill the space between the dimples completely from the base to the top of each dimple but not to cover the top of each dimple. The polyurethane resin was allowed to cure for 4 days at ambient conditions (22° C.; 50 percent Relative Humidity).

Example 7

Figure 5:
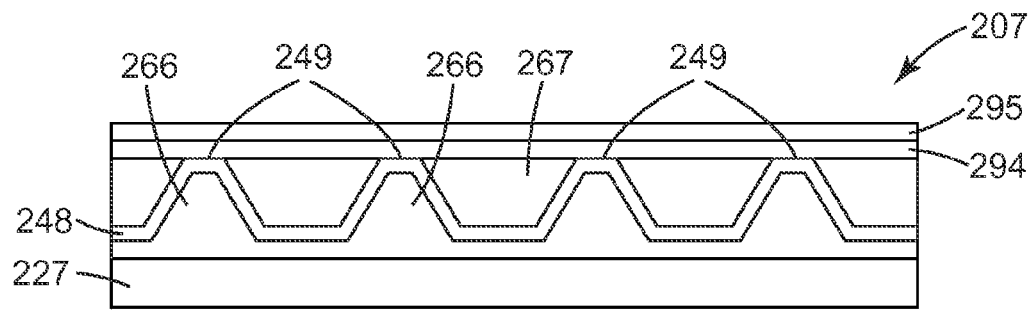

Carbon Fiber Reinforced Plastic Composite Structure with Integral Aluminum Vapor-Coated Structure With reference to FIG. 5, an epoxy resin impregnated carbon fabric, an epoxy adhesive film and vapor deposited aluminum were provided and used to prepare a composite specimen (207). A cured carbon fiber reinforced plastic panel was provided. More specifically, the following materials were assembled and prepared as described in "General Tooling and Bagging of a Composite Part" above. Applied first to the tool, and affixed thereon with heat resistant tape applied at the edges and corners of the film, was a film with a surface having a structure with a varying pattern of 22 mil deep quadrilateral frusta that are 14 mils across at the base and 40 mils to 56 mils across at the exposed face of the film. This film was made in a manner described in U.S. Pat. No. 5,152,917, the disclosure of which is incorporated herein by reference. The film was wiped liberally with a mold parting agent available as 700NC from Loctite, hung vertically to dry for ½ hour at ambient conditions (22° C.; 50 percent Relative Humidity) before applying to this tool. Against this pattern film were applied 3 plies of epoxy film at 0.035 lbs./ft$^2$ available as 3 M™ Scotch-Weld™ Structural Adhesive Film AF 555U 035 from 3 M, forming the support layer (266). Onto the adhesive was applied 13 plies epoxy resin impregnated unidirectional graphite fibers available as P2353U 19 152 from Toray, forming the substrate (227). The curable resins in this assembly were cured as described in "Curing of a Composite Part" above to fabricate a cured panel. The pattern film was removed, leaving an adhesive rich surface with a varying pattern of 22 mil tall apex-truncated square pyramids on the panel. To the structured surface of the panel was applied an 8 micrometer thick aluminum film (248) using a Denton Vapor Deposition chamber creating a cured panel with a conductive structured surface bearing 22 mil tall apex-truncated square pyramids (249). A polyurethane barrier coating (267) was applied to the surface of the cured panel in the following manner to fill entirely the volume available between the base and the peaks of the surface structure. First, the surface of the cured panel was wiped clean with Methyl Ethyl Ketone and allowed to dry for 10 minutes at ambient conditions (22° C.; 50 percent Relative Humidity). Then a coating of polyurethane was applied in the following manner. A polymer solution was prepared. More specifically, 2 parts of polyurethane base available as CA8800/I1050 from PPG Industries and 1 part of activator available as CA8800 from PPG Industries were added to a one liter, narrow-mouthed bottle. The solution was mixed by stirring with a wooden tongue depressor for 3 minutes at ambient conditions (22° C.; 50 percent Relative Humidity). The solution was generously cast onto the structured surface and a plastic applicator such as available as PA-1 from 3 M was used to spread the solution across the panel to fill the volume available features completely between the base and the peaks of the surface structure but not to cover the top of each hill feature. The polyurethane resin was allowed to cure for 4 days at ambient conditions (22° C.; 50 percent Relative Humidity). Two coats of polyurethane paint (294, 295) were then applied in the following manner. A polymer solution was prepared. More specifically, 2 parts of polyurethane base available as CA8800/I1050 from PPG Industries, 1 part of activator available as CA8800 from PPG Industries and 1 part of thinner available as CA8800ST1 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and 2 coats were applied to the surface using a commercially available high volume low pressure sprayer. The paint coating was allowed to dry for 7 days minimum at ambient conditions (22° C.; 50 percent Relative Humidity).

Example 8

Figure 6:
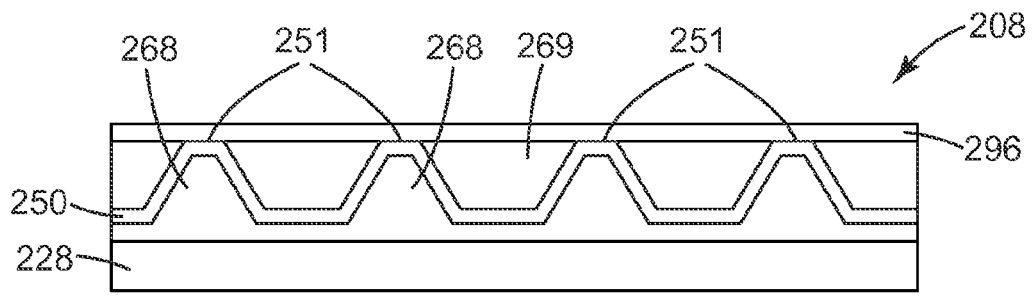

Carbon Fiber Reinforced Plastic Composite Structure with Integral Aluminum Vapor-Coated Structure With reference to FIG. 6, an epoxy resin impregnated carbon fabric, an epoxy adhesive film and vapor deposited aluminum were provided and used to prepare a composite specimen (208). A cured carbon fiber reinforced plastic panel was provided. More specifically, the following materials were assembled and prepared as described in "General Tooling and Bagging of a Composite Part" above. Applied first to the tool, and affixed thereon with heat resistant tape applied at the edges and corners of the film, was a film with a surface having a structure with a varying pattern of 22 mil deep quadrilateral frusta that are 14 mils across at the base and 40 mils to 56 mils across at the exposed face of the film. This film was made in a manner described in U.S. Pat. No. 5,152,917, the disclosure of which is incorporated herein by reference. The film was wiped liberally with a mold parting agent available as 700NC from Loctite, hung vertically to dry for ½ hour at ambient conditions (22° C.; 50 percent Relative Humidity) before applying to the tool. Against this pattern film were applied 3 plies of epoxy film at 0.035 lbs./ft² available as 3 M™ Scotch-Weld™ Structural Adhesive Film AF 555U 035 from 3 M, forming the support layer (268). Onto the adhesive was applied 13 plies epoxy resin impregnated unidirectional graphite fibers available as P2353U 19 152 from Toray, forming the substrate (228) The curable resins in this assembly were cured as described in "Curing of a Composite Part" above to fabricate a cured panel. The pattern film was removed, leaving an adhesive rich surface with a varying pattern of 22 mil tall apex-truncated square pyramids on the panel. To the structured surface of the panel was applied an 8 micrometer thick aluminum film (250) using a Denton Vapor Deposition chamber creating a cured panel with a conductive structured surface bearing 22 mil tall apex-truncated square pyramids (251). A polyurethane barrier coating (269) was applied to the surface of the cured panel in the following manner to fill entirely the volume available between the base and the peaks of the surface structure. First, the surface of the cured panel was wiped clean with Methyl Ethyl Ketone and allowed to dry for 10 minutes at ambient conditions (22° C.; 50 percent Relative Humidity). Then a coating of polyurethane was applied in the following manner. A polymer solution was prepared. More specifically, 2 parts of polyurethane base available as CA8800/I1050 from PPG Industries and 1 part of activator available as CA8800 from PPG Industries were added to a one liter, narrow-mouthed bottle. The solution was mixed by stirring with a wooden tongue depressor for 3 minutes at ambient conditions (22° C.; 50 percent Relative Humidity). The solution was generously cast onto the structured surface and a plastic applicator such as available as PA-1 from 3 M was used to spread the solution across the panel to fill the volume available completely between the base and the peaks of the surface structure but not to cover the top of each hill feature. The polyurethane resin was allowed to cure for 4 days at ambient conditions (22° C.; 50 percent Relative Humidity). One coat of polyurethane paint (296) was then applied in the following manner. A polymer solution was prepared. More specifically, 2 parts of polyurethane base available as CA8800/I1050 from PPG Industries, 1 part of activator available as CA8800 from PPG Industries and 1 part of thinner available as CA8800ST1 from PPG Industries were added to a one liter, narrow-mouthed bottle. The solution was mixed by stirring with a wooden tongue depressor for 3 minutes at ambient conditions (22° C.; 50 percent Relative Humidity). The solution was transferred to a reservoir and one coat was applied to the surface using a commercially available high volume low pressure sprayer. The paint coating was allowed to dry for 7 days minimum at ambient conditions (22° C.; 50 percent Relative Humidity).

Example 9

Figure 7:
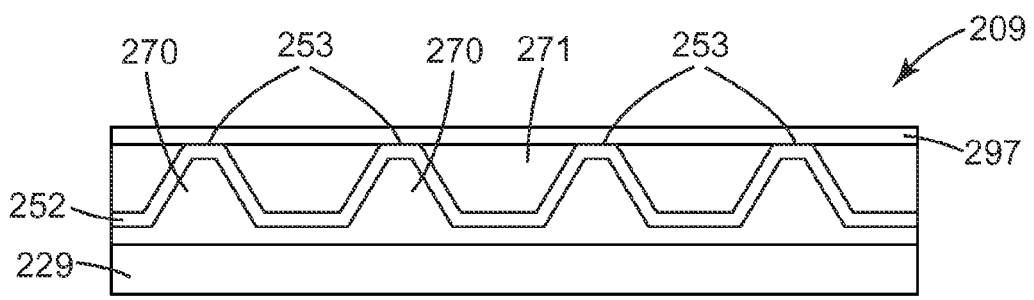

Carbon Fiber Reinforced Plastic Composite Structure with Integral Aluminum Vapor-Coated Structure and Ionizable Paint Overcoat Containing Alkali Salt With reference to FIG. 7, an epoxy resin impregnated carbon fabric, an epoxy adhesive film and vapor deposited aluminum were provided and used to prepare a composite specimen (209). A cured carbon fiber reinforced plastic panel was provided. More specifically, the following materials were assembled and prepared as described in "General Tooling and Bagging of a Composite Part" above. Applied first to the tool, and affixed thereon with heat resistant tape applied at the edges and corners of the film, was a film with a surface having a structure with a varying pattern of 22 mil deep quadrilateral frusta that are 14 mils across at the base and 40 mils to 56 mils across at the exposed face of the film. This film was made in a manner described in U.S. Pat. No. 5,152,917, the disclosure of which is incorporated herein by reference. The film was wiped liberally with a mold parting agent available as 700NC from Loctite, hung vertically to dry for ½ hour at ambient conditions (22° C.; 50 percent Relative Humidity) before applying to the tool. Against this pattern film were applied 3 plies of epoxy film at 0.035 lbs./ft$^2$ available as 3 M™ Scotch-Weld™ Structural Adhesive Film AF 555U 035 from 3 M, forming the support layer (270). Onto the adhesive was applied 13 plies epoxy resin impregnated unidirectional graphite fibers available as P2353U 19 152 from Toray, forming the substrate (229). The curable resins in this assembly were cured as described in "Curing of a Composite Part" above to fabricate a cured panel. The pattern film was removed, leaving an adhesive rich surface with a varying pattern of 22 mil tall apex-truncated square pyramids on the panel. To the structured surface of the panel was applied an 8 micrometer thick aluminum film (252) using a Denton Vapor Deposition chamber creating a cured panel with a conductive structured surface bearing 22 mil tall apex-truncated square pyramids (253). A polyurethane barrier coating (271) was applied to the surface of the cured panel in the following manner to fill entirely the volume available between the base and the peaks of the surface structure. First, the surface of the cured panel was wiped clean with Methyl Ethyl Ketone and allowed to dry for 10 minutes at ambient conditions (22° C.; 50 percent Relative Humidity). One coat of polyurethane paint containing alkali salt (297) was then applied in the following manner. A polymer solution was prepared. More specifically, 4 parts of polyurethane base available as CA8800/I1050 from PPG Industries and 2 parts of activator available as CA8800 from PPG Industries and 1 part Cesium Nitrate powder were added to a one liter, narrow-mouthed bottle. The solution was mixed by stirring with a wooden tongue depressor for 3 minutes at ambient conditions (22° C.; 50 percent Relative Humidity). The solution was generously cast onto the structured surface and a plastic applicator such as available as PA-1 from 3 M was used to spread the solution across the panel to completely fill the volume available between the base and the peaks of the surface structure but not to cover the top of each hill feature. The polyurethane resin was allowed to cure for 4 days at ambient conditions (22° C.; 50 percent Relative Humidity).

Evaluation of Examples 1C-5C (Comparative) and 6-9

After curing, a direct effects lightning strike current test per SAE ARP5416 Aircraft Lightning Test Methods was performed on several of the panels as follows. Coupons from Examples 1C-5C and 6-9 were trimmed with a diamond saw to 16 inch by 16 inch specimens and mounted in the test fixture. Aluminum bars were clamped to the perimeter of each panel and electrically bonded to the test fixture with tinned copper braids. A jet-diverting test electrode was suspended near the center of the test panel and approximately 1 inch from the surface of the panel. To each panel was made at least one discharge to transfer Current Component C, approximately 200 coulombs, as described in SAE ARP5412 Aircraft Lightning Environment and Related Test Waveforms. The surface of each damaged area was examined at 16×. Each panel was sectioned through the damaged areas with a diamond saw, polished with 1200 grit abrasive and microscopically viewed at 50× or greater for damage. Table I reports the test results, and, for comparison, the weight of conductor material in each sample.

TABLE I

| Ex. | Resulting Damage | Conductor Weight (g/m$^2$) | Quality of Attachment <1> |
|---|---|---|---|
| 1C | Damage to cosmetic finish and conductive layer vaporized at attachment site. | 319 | MS |
| 2C | Damage penetrated panel | 63 | SS |
| 3C | Damage to cosmetic finish and conductive layer vaporized at attachment site. | 73 | SM |
| 4C | Damage to structural plies | 73 | MS |
| 5C | Damage to structural plies | 653 | SS |
| 6 | Damage to cosmetic finish and conductive layer vaporized at attachment site. | 867 | SM |
| 7 | Damage to cosmetic finish and conductive layer partially vaporized at attachment site. | 7 | MRM |
| 8 | Damage to cosmetic finish and conductive layer partially melted at attachment site. | 7 | MRM |
| 9 | Damage to cosmetic finish only | 7 | MRM |

<1> Quality of the Attachment:
SS = Single Stationary Attachment. The arc attached to a single site on the test panel and remained attached at the same site through the test.
MS = Multiple Stationary Attachments. The arc attached to multiple sites on the test panel and remained attached to those same sites through the test.
SM = Single Attachment Slowly Moving. The arc attached to a single site on the test panel and occasionally moved to another single site at several intervals during the test.
MRM = Multiple Rapidly Moving Attachments. The arc attached to multiple sites on the test panel and moved rapidly among available sites through the test.

Examples 10C (Comparative), 11 and 12

Three types of test coupons were made, as described in Table II.

TABLE II

| Ex. | Conductive Features | Non-Conductive Features |
|---|---|---|
| 10C | 2024-T3 Bare Aluminum Panel | Uniformly coated with polyurethane over entire panel. |
| 11 | A micro-replicated sheet presenting hill features was vapor coated over the entire surface with copper. | Coated with polyurethane so that peaks of the hill features were not entirely covered. |
| 12 | A micro-replicated sheet presenting hill features was vapor coated over the entire surface with aluminum. | |

Test coupons for Examples 11 and 12 were made as follows. A fabric backed aluminum oxide film with a surface having a structure with a varying pattern of 25 mil high quadrilateral frusta that are 4 mils across at the peak and 11 mils to 15 mils across at the base, available as Trizact™ Abrasive Belts from 3 M, was provided. To the structured surface of the panel was applied a 0.1 micron metal film using a Denton Vapor Deposition chamber to create a panel with a conductive structured surface. The metal was copper for the coupons of Example 11 and aluminum for the coupons of Example 12. A polyurethane barrier coating was applied to the surface of all of the coupons of Examples 10C, 11 and 12 in the following manner to fill entirely the volume available between the base and the peaks of the surface structure. First, the surface of the panel was wiped clean with Methyl Ethyl Ketone and allowed to dry for 10 minutes at ambient conditions (22° C.; 50 percent Relative Humidity). Then a coating of polyurethane was applied in the following manner. A polymer solution was prepared. More specifically, 2 parts of polyurethane base available as CA8800/I1050 from PPG Industries and 1 part of activator available as CA8800 from PPG Industries were added to a one liter, narrow-mouthed bottle. The solution was mixed by stirring with a wooden tongue depressor for 3 minutes at ambient conditions (22° C.; 50 percent Relative Humidity). The solution was generously cast onto the structured surface and a plastic applicator such as available as PA-1 from 3 M was used to spread the solution across the panel. In the case of Examples 11 and 12, the solution completely filled the volume between the base and the peaks of the surface structure but did not cover the top of each hill feature. The polyurethane resin was allowed to cure for 4 days at ambient conditions (22° C.; 50 percent Relative Humidity).

Multiple coupons of each type were made and tested, as reported in Table III. Each coupon was placed in a Phenix Technologies Model LD60 Liquid Dielectric Test Set modified to accept film samples with a 3 to 4.5 mm air gap between the electrode and the test coupon. An electric potential was applied at a voltage which increased at a rate of 3000 volts per second until an arc was created across the air gap between the electrode and the test coupon. The value of the electrical potential and duration of the arcing event were recorded at the moment the arc developed. A high speed camera operating in the visual electromagnetic range was used to capture the event on progressive frames. The high speed photos were used to assess the number of discrete attachment locations on the test panel during the arcing event. Damage to the coupon was assessed by visual inspection. Results are presented in Table III.

TABLE III

| Ex. | Number of Specimens | Event Duration | Number of Discrete Attachment Points | Breakdown Voltage |
| --- | --- | --- | --- | --- |
| 10C | 2 | 0.01 sec | 1 | 3 kV/mm gap |
| 11 | 4 | 0.02-0.03 sec | 16 to 23 | 2 kV/mm gap |
| 12 | 4 | 0.02-0.03 sec | 40 to 60 | 2 kV/mm gap |

The electrical arc attached to the panels with the discrete preferentially conductive sites at significantly more points than it attached to panels that were uniformly coated with a non-conductive paint. By increasing the number of attachment locations from 1 to between 20 and 60, the local current density may be reduced by as much as 98%. This may allow a corresponding reduction in the thickness, or weight, of the protection system. It may also create an opportunity to use conductive materials that are lighter weight or less expensive but would be otherwise incapable of protecting the structure from the local effects of the electrical current and heat generated during the event.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A lightning protection sheet comprising a substantially continuous, metallic, electrically conductive film having a thickness t, where the electrically conductive film is patterned into a plurality of hill features having a height h greater than t;
    wherein t is between 0.001 and 100 microns.
2. The lightning protection sheet according to claim 1 wherein h is greater than 3 times t.
3. The lightning protection sheet according to claim 1 wherein h is greater than 10 times t.
4. The lightning protection sheet according to claim 1 wherein t is between 0.01 and 10 microns.
5. The lightning protection sheet according to claim 1 wherein h is between 6 microns and 1 mm.
6. The lightning protection sheet according to claim 1 which contains an amount of electrically conductive material weighing less than 50 g/m$^2$.
7. The lightning protection sheet according to claim 1 comprising no electrically conductive layer other than substantially continuous electrically conductive films having a thickness t, where the electrically conductive films are patterned into a plurality of hill features having a height h greater than t.
8. The lightning protection sheet according to claim 1 comprising no electrically conductive layer other than substantially continuous electrically conductive films having a thickness between 0.001 and 100 microns.
9. The lightning protection sheet according to claim 1 additionally comprising an electrically non-conductive support layer underneath the continuous electrically conductive film, where the support layer has an upper surface that has substantially the same pattern of hill features as the electrically conductive film.
10. The lightning protection sheet according to claim 1 additionally comprising an electrically non-conductive discriminator layer over the electrically conductive film.
11. The lightning protection sheet according to claim 1 additionally comprising an electrically non-conductive discriminator layer covering portions of the electrically conductive film, wherein the hill features comprise tops which are not covered by the discriminator layer.
12. The lightning protection sheet according to claim 1 additionally comprising an electrically non-conductive discriminator layer covering the electrically conductive film.
13. The lightning protection sheet according to claim 10 wherein the electrically non-conductive discriminator layer comprises ionizable pigments.
14. The lightning protection sheet according to claim 1 additionally comprising an adhesive layer.
15. The lightning protection sheet according to claim 1 comprising no adhesive layer.
16. The lightning protection sheet according to claim 1 comprising an ionizable paint layer.
17. A composite aircraft structure bearing the lightning protection sheet according to claim 1.
18. The lightning protection sheet according to claim 3 wherein t is between 0.01 and 10 microns.
19. A wind turbine generator structure bearing the lightning protection sheet according to claim 1.

* * * * *

UNITED STATES PATENT AND TRADEMARK OFFICE
CERTIFICATE OF CORRECTION

PATENT NO. : 8,922,970 B2  Page 1 of 1
APPLICATION NO. : 12/761162
DATED : December 30, 2014
INVENTOR(S) : Larry Hebert It is certified that error appears in the above-identified patent and that said Letters Patent is hereby corrected as shown below:

Title Page, Item (56)
Under "Other Publications," Line 2, delete "ionizatiohn" and insert -- ionization --, therefor.

Page 2, Column 2
Under "Other Publications," Line 10, delete "Appled" and insert -- Applied --, therefor.

Specification

Column 9
Line 14, delete "make" and insert -- made --, therefor.

Column 11
Line 61, delete "4,4-methylenedicyclohexl" and insert -- 4,4-methylenedicyclohexyl --, therefor.

Signed and Sealed this
Twenty-seventh Day of October, 2015

Michelle K. Lee
*Director of the United States Patent and Trademark Office*